United States Patent [19]
Kirby

[11] 4,349,221
[45] Sep. 14, 1982

[54] END FITTING ASSEMBLY FOR A CONDUIT

[75] Inventor: Roy J. Kirby, Slough, England

[73] Assignee: Superflexit Limited, Slough, England

[21] Appl. No.: 110,611

[22] Filed: Jan. 9, 1980

[51] Int. Cl.³ .............................................. F16L 39/02
[52] U.S. Cl. ................................... 285/149; 285/242; 285/DIG. 4
[58] Field of Search ................ 285/149, 256, DIG. 4, 285/242

[56] References Cited

U.S. PATENT DOCUMENTS

| | | | |
|---|---|---|---|
| 2,150,471 | 3/1939 | Van Vulpen | 285/149 |
| 2,357,669 | 9/1944 | Lake | 285/149 |
| 2,638,361 | 5/1953 | Melsom | 285/149 |
| 2,753,196 | 7/1956 | Melsom | 285/149 |
| 2,848,254 | 8/1958 | Millar | 285/149 |
| 2,888,277 | 5/1959 | Melsom | 285/149 |
| 3,115,353 | 12/1963 | Previati | 285/149 X |
| 3,844,587 | 10/1974 | Fuhrmann et al. | 285/DIG. 4 X |

FOREIGN PATENT DOCUMENTS

| | | | |
|---|---|---|---|
| 715437 | 8/1965 | Canada | 285/149 |
| 672398 | 3/1939 | Fed. Rep. of Germany . | |
| 1244793 | 9/1960 | France | 285/149 |
| 482315 | 1/1970 | Switzerland . | |
| 507901 | 6/1939 | United Kingdom | 285/256 |
| 879865 | 10/1961 | United Kingdom . | |
| 885972 | 1/1962 | United Kingdom | 285/149 |
| 930096 | 7/1963 | United Kingdom . | |
| 1037718 | 8/1966 | United Kingdom . | |
| 1083741 | 9/1967 | United Kingdom | 285/256 |
| 1209258 | 10/1970 | United Kingdom . | |

*Primary Examiner*—Thomas F. Callaghan
*Attorney, Agent, or Firm*—Stevens, Davis, Miller & Mosher

[57] ABSTRACT

An end fitting assembly for a conduit (10) having an internal screen (11), comprises a nipple (15) adapted to be inserted in at least an end portion (12) of the conduit (10) and a sleeve (23) adapted to co-operate with the nipple (15) about which the screen (11) can be folded, the arrangement being such that the folded portion of the screen (11) is clamped between the sleeve (23) and an adjacent co-operating portion of the nipple (15).

4 Claims, 1 Drawing Figure

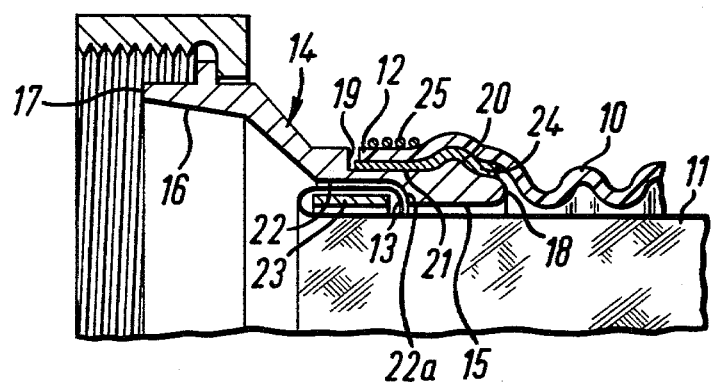

END FITTING ASSEMBLY FOR A CONDUIT

This invention relates to an end fitting assembly for a conduit.

According to the present invention there is provided an end fitting assembly for a conduit having an internal screen, which fitting comprises:

a nipple adapted to be inserted in at least an outer portion of said conduit, and a sleeve adapted to co-operate with said nipple about which said screen can be folded, the arrangement being such that the folded portion of the screen is clamped between the sleeve and an adjacent co-operating portion of the nipple.

The nipple may be provided with a circumferential recess for receiving the folded portion of the screen.

The circumferential recess may be provided internally of the nipple.

The sleeve may have an internal diameter corresponding to a internal diameter of a portion of the nipple adjacent the recess.

The internal screen may comprise a tubular braid of tinned copper wire.

Following is a description, by way of example only and with reference to the accompanying drawing which is a diagrammatic representation, of one method of carrying the invention into effect.

Referring now to the drawing, there is shown an outer convoluted tube 10 of plastics material and an inner co-axial tube 11 of braided tinned copper wire. The outer tube 10 has an end portion 12 and the inner tube 11 has an end portion 13. The end portions 12, 13 of the tubes 10, 11 have inserted therebetween a cylindrical portion 15 of an end fitting 14. The end fitting 14 expands from the cylindrical portion 15 to a portion 16 of enlarged diameter. The end fitting has a front end wall 17 and a rear end wall 18. The cylindrical portion 15 has a circumferential shoulder 19 and a circumferential bead 20 spaced axially rearwardly from the shoulder 19 thereby defining a groove 21. The outer circumferential surface of the cylindrical portion 15 between the bead 20 and the rear end wall 18 is tapered rearwardly and inwardly of the cylindrical portion 15. The cylindrical portion 15 is provided with an inner circumferential recess 22 extending axially rearwardly of the cylindrical portion 15 the recess having a radial end wall 22a.

The recess 22 is adapted to receive a sleeve 23. The internal diameter of the sleeve 23 is substantially the same as the internal diameter of the cylindrical portion 15 adjacent the recess 2. The external diameter of the sleeve 23 is less than the diameter of recess 22. The difference between the external diameter of the sleeve 23 and the diameter of the recess 22 is less than unit cross sectional area of the inner tube 11.

The outer tube 10 and the cylindrical portion 15 have inserted therebetween a cylindrical gasket 24. The outer tube 10 is secured relative to the cylindrical portion 15 by means of a clamp 25.

The end fitting 14 is connected with the outer tube 10 and the inner tube 11 by locating the cylindrical gasket 24 on the cylindrical portion 15 so that the gasket is located in the groove 21 and extends rearwardly over the bead 20. The cylindrical portion 15 then is inserted between the outer tube 10 and the inner tube 11 so that the end portion 12 of the outer tube 10 is located on the portion of the gasket 24 contained in the groove 21. The clamp 25 then is located circumferentially around the end portion 12 of the tube 10 and is tightened so as to secure the outer tube 10 relative to the end fitting 14.

The sleeve 23 then is inserted axially of the inner tube 11 beyond the end portion 13 and the end portion 13 is turned outwardly and rearwardly of the inner tube 11 over the sleeve 23. The sleeve 23 having the end portion 13 of the inner tube 11 located on an outer surface thereof is inserted axially into the recess 22. Since the difference between the outer circumference of the sleeve 23 and the inner circumference of the groove 21 is less than unit cross sectional area of the inner tube 11, the end portion 13 of the inner tube 11 is squeezed between the sleeve 23 and the cylindrical portion 15 such that the sleeve 23 is insertable into the recess 22 only by applying increased force thereto. The sleeve 23 then is pushed axially of the recess 22 so that an annular portion of the inner tube 11 is gripped between the radial end wall 22a of the recess 22 and an adjacent side wall of the sleeve 23.

In this manner, the internal tube 11 is positively retained in the end fitting 14 but may be removed or replaced without damage to the tube 11, the cylindrical portion 15 or the end fitting 14. Furthermore, since the internal diameter of the sleeve is substantially the same as the diameter of the cylindrical portion 15 adjacent the recess 22, the sleeve does not reduce the bore of the cylindrical portion 15. Also, the end fitting 14 may be used whether or not the inner tube 11 is present.

I claim:

1. A conduit and end fitting assembly, comprising a plastic tube, a coaxial tubular screen spaced radially inwardly of the said plastic tube and substantially concentric therewith, said end fitting having a first end portion comprising means for removably connecting the said assembly to a mating fitting and having a tubular portion of smaller diameter than said first end portion disposed between end portions of said screen and of said plastic tube, said tubular portion of the end fitting being integral with said first end portion of the fitting through an annular shoulder and terminating in an opposite end, a radially outwardly projecting annular bead on said tubular portion between said shoulder and said opposite end, said plastic tube being disposed about said tubular portion and abutting against said shoulder, a gasket disposed between said tubular portion and said plastic tube, means compressing said gasket between the plastic tube and said tubular protion to form a fluid tight seal, said tubular portion having an annular recess in its surface opposite said shoulder, and a sleeve disposed in said recess with its inner surface disposed on the screen and one of said ends of the screen folded over the external surface of the sleeve forming an interference fit in said recess.

2. The conduit and end fitting assembly of claim 1 wherein the tubular screen is tinned copper.

3. An end fitting for a conduit having an internal screen and an outer convolute tube which has an end portion, said fitting comprising, a nipple adapted to be inserted in at least said end portion of said outer convolute tube and including an internal bore, said nipple having an annular internal recess adjacent said bore, a sleeve disposed in said recess adapted to co-operate with the internal bore of said nipple for entrapping said screen, said sleeve having an internal diameter which corresponds to the diameter of the nipple adjacent said recess, whereby with the end portion of the tube inserted over said nipple, said sleeve with an end of said screen folded thereover may be manually urged as an interference fit into said nipple, thereby to secure the screen to the nipple, and clamping means positioned about the exterior periphery of the outer tube and contracted thereon substantially perpendicularly to the axis of the fitting.

4. An assembly as claimed in claim 3, wherein the internal screen comprises a tubular braid of tinned copper wire.

* * * * *